US010073861B2

(12) United States Patent
Shamir et al.

(10) Patent No.: US 10,073,861 B2
(45) Date of Patent: Sep. 11, 2018

(54) STORY ALBUMS

(71) Applicant: Disney Enterprises, Inc., Burbank, CA (US)

(72) Inventors: Ariel Shamir, Jerusalem (IL); Oz Radiano, Tel Aviv (IL); Leonid Sigal, Pittsburgh, PA (US); Moshe B. Mahler, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 57 days.

(21) Appl. No.: 14/844,660

(22) Filed: Sep. 3, 2015

(65) Prior Publication Data
US 2017/0068643 A1 Mar. 9, 2017

(51) Int. Cl.
*G06F 17/30* (2006.01)
*G06F 17/24* (2006.01)

(52) U.S. Cl.
CPC ...... *G06F 17/30256* (2013.01); *G06F 17/241* (2013.01); *G06F 17/248* (2013.01); *G06F 17/3028* (2013.01); *G06F 17/30038* (2013.01); *G06F 17/30056* (2013.01)

(58) Field of Classification Search
CPC .................................................. G06F 17/509
See application file for complete search history.

(56) References Cited

U.S. PATENT DOCUMENTS 7,148,990 B2 * 12/2006 Atkins ............... H04N 1/00132
358/1.18
7,281,199 B1 * 10/2007 Nicol ................ G06F 17/30038
707/E17.009
2002/0095439 A1 * 7/2002 Long ....................... G06T 11/60
715/243
2003/0033581 A1 * 2/2003 Mukai ....................... G03F 1/36
716/52
2003/0072486 A1 * 4/2003 Loui ....................... G06T 11/60
382/175
2004/0019852 A1 * 1/2004 Purvis ................... G06F 17/211
715/210

(Continued)

OTHER PUBLICATIONS

Chu W.-T., Yu C.-H., Wang H.-H.: Optimized comics-based storytelling for temporal image sequences. IEEE Transactions on Multimedia 17, 2 (2015), 201-215.

(Continued)

*Primary Examiner* — Scott Baderman
*Assistant Examiner* — Mario M Velez-Lopez
(74) *Attorney, Agent, or Firm* — Patterson + Sheridan, LLP

(57) ABSTRACT

Systems, methods, and computer program products to perform an operation comprising assigning each of a plurality of nodes of a graph to a distinct image, of a plurality of images, wherein the graph represents a story, wherein each node corresponds to a respective element of the story, wherein each node comprises: (i) an attribute and (ii) a text of the respective element of the story, wherein the plurality of graph nodes are assigned based on a set of attributes of each of the plurality of images and the attribute of each node, and generating a visual depiction of the story, wherein the visual depiction comprises an ordered representation of each of the distinct images and the text of each respective element of the story.

20 Claims, 9 Drawing Sheets

(56) References Cited

U.S. PATENT DOCUMENTS

| | | | | |
|---|---|---|---|---|
| 2005/0071783 | A1* | 3/2005 | Atkins | G06F 17/509 |
| | | | | 715/851 |
| 2006/0200758 | A1* | 9/2006 | Atkins | G06T 11/60 |
| | | | | 715/209 |
| 2006/0279566 | A1* | 12/2006 | Atkins | G06F 17/211 |
| | | | | 345/418 |
| 2007/0118797 | A1* | 5/2007 | Layzell | G06F 17/211 |
| | | | | 715/234 |
| 2008/0313533 | A1* | 12/2008 | Hoyer | G06F 17/211 |
| | | | | 715/243 |
| 2009/0034842 | A1* | 2/2009 | Grosvenor | H04N 1/3872 |
| | | | | 382/173 |
| 2011/0179390 | A1* | 7/2011 | Morris | G06F 3/0482 |
| | | | | 715/854 |
| 2015/0058708 | A1* | 2/2015 | Georgiev | G06F 17/248 |
| | | | | 715/202 |
| 2016/0110355 | A1* | 4/2016 | Charania | G06F 17/3028 |
| | | | | 382/224 |

OTHER PUBLICATIONS

Delgado D., Magalhaes J., Correia N.: Assisted news reading with automated illustration. In Proceedings of the International Conference on Multimedia (2010), pp. 1647-1650.

Huang C.-J., Li C.-T., Shan M.-K.: Vizstory: Visualization of digital narrative for fairy tales. In Technologies and Applications of Artificial Intelligence (TAAI), 2013 Conference on (2013), IEEE, pp. 67- 72. [Abstract Only] [Accessed Online Apr. 4, 2018].

Li B., Thakkar M., Wang Y., Riedl M. O.: Storytelling with adjustable narrator styles and sentiments. In Interactive Storytelling, Mitchell A., Ferna?ndez-Vara C., Thue D., (Eds.), vol. 8832 of Lecture Notes in Computer Science. 2014, pp. 1-12.

Radiano et al., "Story Albums: Creating Fictional Stories from Personal Photograph Sets," Computer Graphics forum, vol. 36, 2017, pp. 1-12.

* cited by examiner

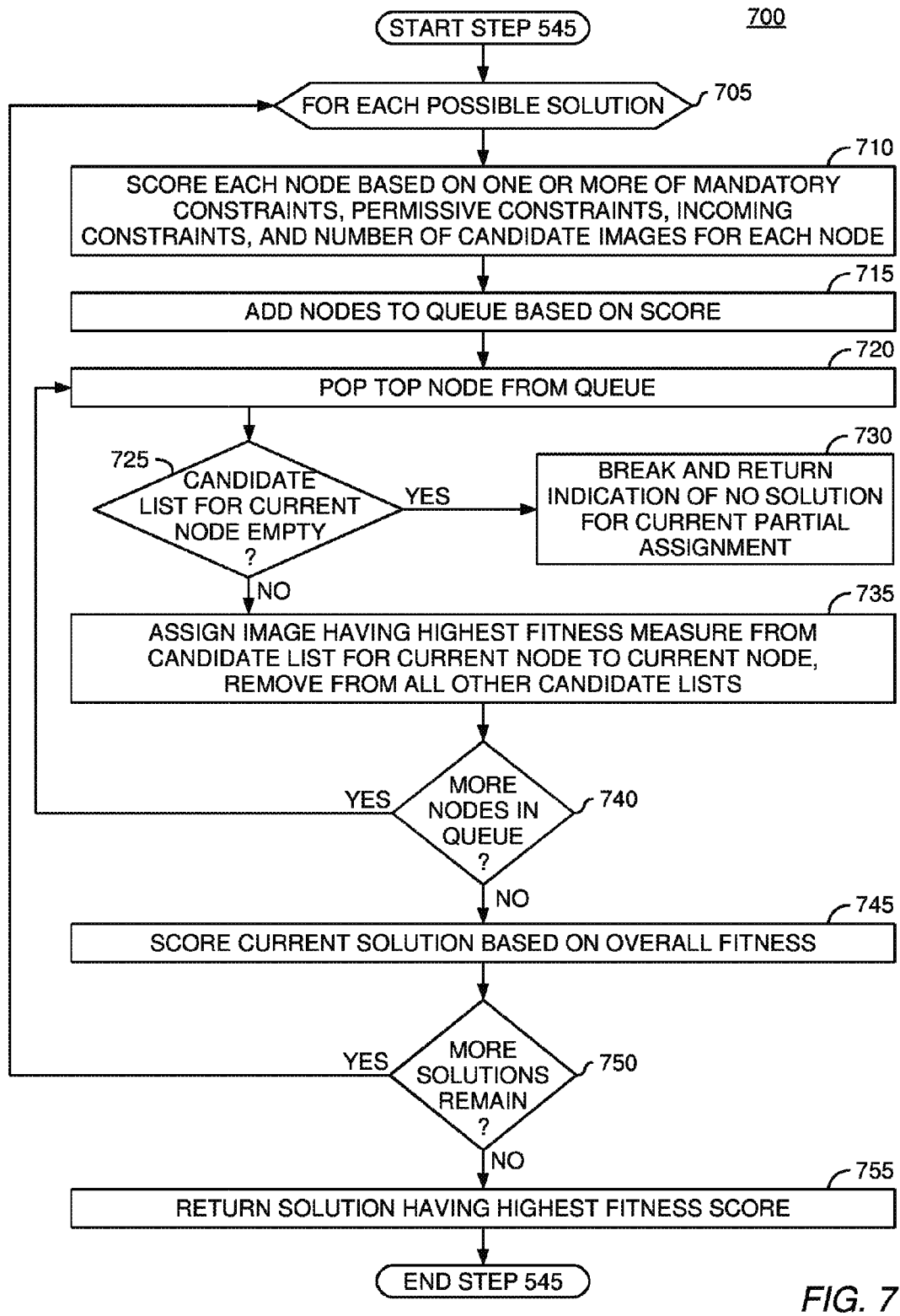

STORY ALBUMS

BACKGROUND

Field of the Invention

Embodiments disclosed herein relate to manage digital images. More specifically, embodiments disclosed herein relate to computer software to generate story albums.

Description of the Related Art

With the proliferation of image capture devices, people can easily generate large collections of digital images and video. Often, however, people do not view the images or video once captured. Previous attempts to organize and present image or video content have focused on selecting salient or diverse content, but the summaries generated by these approaches are often ignored by users.

SUMMARY

Embodiments disclosed herein include systems, methods, and computer program products to perform an operation comprising assigning each of a plurality of nodes of a graph to a distinct image, of a plurality of images, wherein the graph represents a story, wherein each node corresponds to a respective element of the story, wherein each node comprises: (i) an attribute and (ii) a text of the respective element of the story, wherein the plurality of graph nodes are assigned based on a set of attributes of each of the plurality of images and the attribute of each node, and generating a visual depiction of the story, wherein the visual depiction comprises an ordered representation of each of the distinct images and the text of each respective element of the story.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 7 is a flow chart illustrating a method to select a best solution for assigning nodes to images, according to one embodiment.

DETAILED DESCRIPTION

Embodiments disclosed herein create visually appealing fictional stories (referred to herein as story albums) from a collection of digital images (and/or videos). In one embodiment, a story application creates the story albums. The story album may use a graph model to represent an artist-generated story. Each node in the graph represents an element (or frame) of the story. Each story element may be a unit of the fictional story, corresponding to, for example and without limitation, frames in comics or storyboards and chapters in a book. Each node in the graph may specify different attributes, for example people (or fictional characters) present in the associated story element, a location the story element occurs, supporting objects, and a time of day the story element occurs. Edges of the graph connecting two nodes encode progression among the story elements and encode the discourse of the story through dependencies and constraints between the nodes. Based on a given graph, embodiments disclosed herein may use a constraint satisfaction algorithm to generate a one-to-one assignment of graph nodes to images. Once each node is assigned to an image, forming a sequence of images, embodiments disclosed herein generate a visual depiction of the story—referred to as a story album—in a variety of different styles. Each style uses a library of layout templates and the image sequence is matched to the best set of templates by fitting images and story text to the templates.

For example, a first story template may accommodate 10 figures and have text that accompanies each figure. The first story template may therefore be represented by a graph having 10 nodes, with each node specifying a number of constraints. A user may request to generate a story album based on a set of 100 images the user took on a recent trip to a theme park. The story application may assign each node of the graph to one image, such that 10 of the 100 images are included in the story album. The story application may assign nodes to images by identifying which 10 of the 100 images best satisfy the constraints of the nodes and the constraints between the nodes. The story application may then optimize the layout of the first story template by partitioning the story to pages and selecting the best template for each page. The story application may then return the optimized layout as responsive to the user's request to generate the story album.

To facilitate explanation, embodiments of the disclosure are described using digital images as a reference example of user-provided content. However, one of skill in the art will readily recognize for creating story albums may be adapted to use a variety of multi-media, including images, sound, and video.

Figure 1:
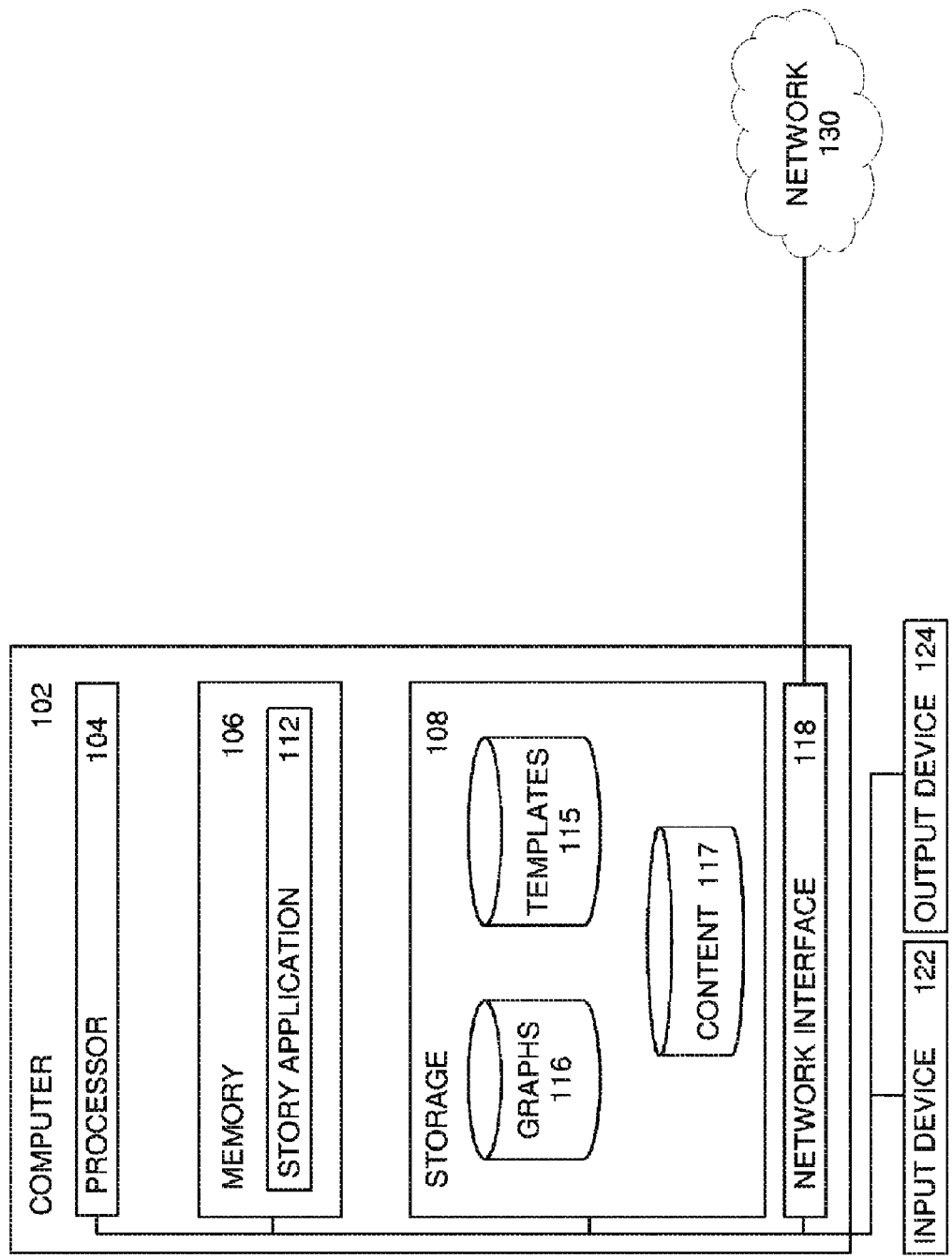
FIG. 1 is a block diagram illustrating a system configured to generate story albums, according to one embodiment.

FIG. 1 is a block diagram illustrating a system 100 configured to generate story albums, according to one embodiment. As shown, the system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 which obtains instructions and data via a bus 120 from a memory 106 and/or a storage 108. The computer 102 may also include one or more network interface devices 118, input devices 122, and output devices 124 connected to the bus 120. The computer 102 is generally under the control of an operating system (not shown). Examples of operating systems include the UNIX operating system, versions of the Microsoft Windows operating system, and distributions of the Linux operating system. More generally, any operating system supporting the functions disclosed herein may be used. The processor 104 is a programmable logic device that performs instruction, logic, and mathematical processing, and may be representative of one or more CPUs. The network interface device 118 may be any type of network communications device allowing the computer 102 to communicate with other computers via the network 130.

The storage 108 is representative of hard-disk drives, solid state drives, flash memory devices, optical media and the like. Generally, the storage 108 stores application programs and data for use by the computer 102. In addition, the memory 106 and the storage 108 may be considered to include memory physically located elsewhere; for example, on another computer coupled to the computer 102 via the bus 120.

The input device 122 may be any device for providing input to the computer 102. For example, a keyboard and/or a mouse may be used. The input device 122 represents a wide variety of input devices, including keyboards, mice, controllers, and so on. Furthermore, the input device 122 may include a set of buttons, switches or other physical device mechanisms for controlling the computer 102. The output device 124 may include output devices such as monitors, touch screen displays, and so on.

As shown, the memory 106 contains the story application 112, which is generally configured to generate a visual depiction of a fictional story (referred to as a story album) based on digital images. The story application 112 generally generates a story album based from a collection of images provided by a user. The story application 112 may extract attributes from each image, which may be found in metadata of each image, extracted by analysis of the image data, or defined by a user. For example, the story application 112 may extract image metadata specifying a timestamp reflecting when the image was captured and global positioning system (GPS) coordinates reflecting where the image was captured. As another example, the story application 112 may apply facial recognition algorithms to identify people (or fictional characters) in each image. As still another example, the story application 112 may analyze the image data to identify landmarks or other events in the image.

The story application 112 may then select a subset of the images that best fits a predefined story, and rate this selection relative to other selections of images (based on one or more predefined factors). Once the story application 112 identifies a subset of images, the story application 112 may then convert the selected subset of images to a story album using one or more predefined templates. The story application 112 may then score each story album based on one or more predefined factors, and output the highest scoring story album to the user.

As shown, the storage 108 contains templates 115, graphs 116, and content 117. Each template 115 may provide a general foundation for a story album. For example, an artist may generate a number of different predefined fictional stories, and each fictional story may be associated with a number of different templates in the templates 115. The templates 115 may provide different layouts for each page of each story, such as a poster layout, comic book layout, book layout (with multiple pages), and the like. Each template 115 includes a placeholder for a plurality of images and text associated with each image. The text may be predefined text associated with the respective story, and may include wildcards that the story application 112 may update according to the image associated with a given node.

The content 117 includes user-provided content such as images and videos. The story application 112 may use the content 117 to generate a story album. The content 117 may be directly uploaded by a user, or may be retrieved from a remote location, such as an online file sharing platform. Each item in the content 117 may include associated metadata. For example, the metadata may describe an owner of the content, a location the content was taken (in GPS coordinates or a real-world place, such as a movie theater, theme park ride, and the like), who is pictured in the content, and what is depicted in the content. The story application 112 may extract the attributes from the content, or a user may specify the attributes manually. In at least one embodiment, the story application 112 may compute a quality score for each item of content 117, and store the quality score as associated metadata in the content 117. The quality score may be based on any number and type of factors of a given image, including blurriness, lighting, composition, and the like.

Each graph 116 may be associated with an artist-generated story. Each graph 116 has a plurality of nodes and edges, and one or more graphs 116 may be a multi-graph in that more than one edge can connect two graph nodes. The nodes of each graph 116 generally correspond to a distinct unit of each story, such as a frame in a comic or storyboard. The nodes of each graph 116 may also specify attributes regarding the story unit and constraints related to any image that the node may be assigned to. While any number and type of attributes may be specified for each node, in one embodiment, each node is configured to hold values describing "who," "what," "where," and "when" of a given story frame. For example, the "who" may be a fictional character, the "what" may be a greeting, the "where" may be a location in a theme park, and the "when" may be a time of day the fictional character is greeting the user. The nodes of each graph may further include text that is displayed along with the selected image in the final output. The edges of the graphs 116 encode dependencies between the nodes that pertain to each element of the respective story. For example, a first edge may connect nodes A and B, and specify a mandatory constraint that an image assigned to node A must occur earlier in time than an image assigned to node B. The constraints may be associated with a given edge and imputed to the connected nodes.

The story application 112 may use the constraints specified by a given node (and/or graph edges) to match nodes to digital images (or other media). Some constraints may be mandatory (referred to as "hard") constraints or permissive (referred to as "soft") constraints. Generally, a mandatory constraint must be satisfied by an image to have a node assigned to the image, while a permissive constraint does not need to be satisfied by an image to have a node assigned to the image. For example, a mandatory constraint for a graph node may specify that an image assigned to the node should depict at least two people and not also depict a castle. Similarly, a permissive constraint could specify a preference that an image assigned was taken in the morning. The story application 112 may use permissive constraints to assign nodes to images when multiple images each satisfy all mandatory constraints of a given node.

Figure 2:
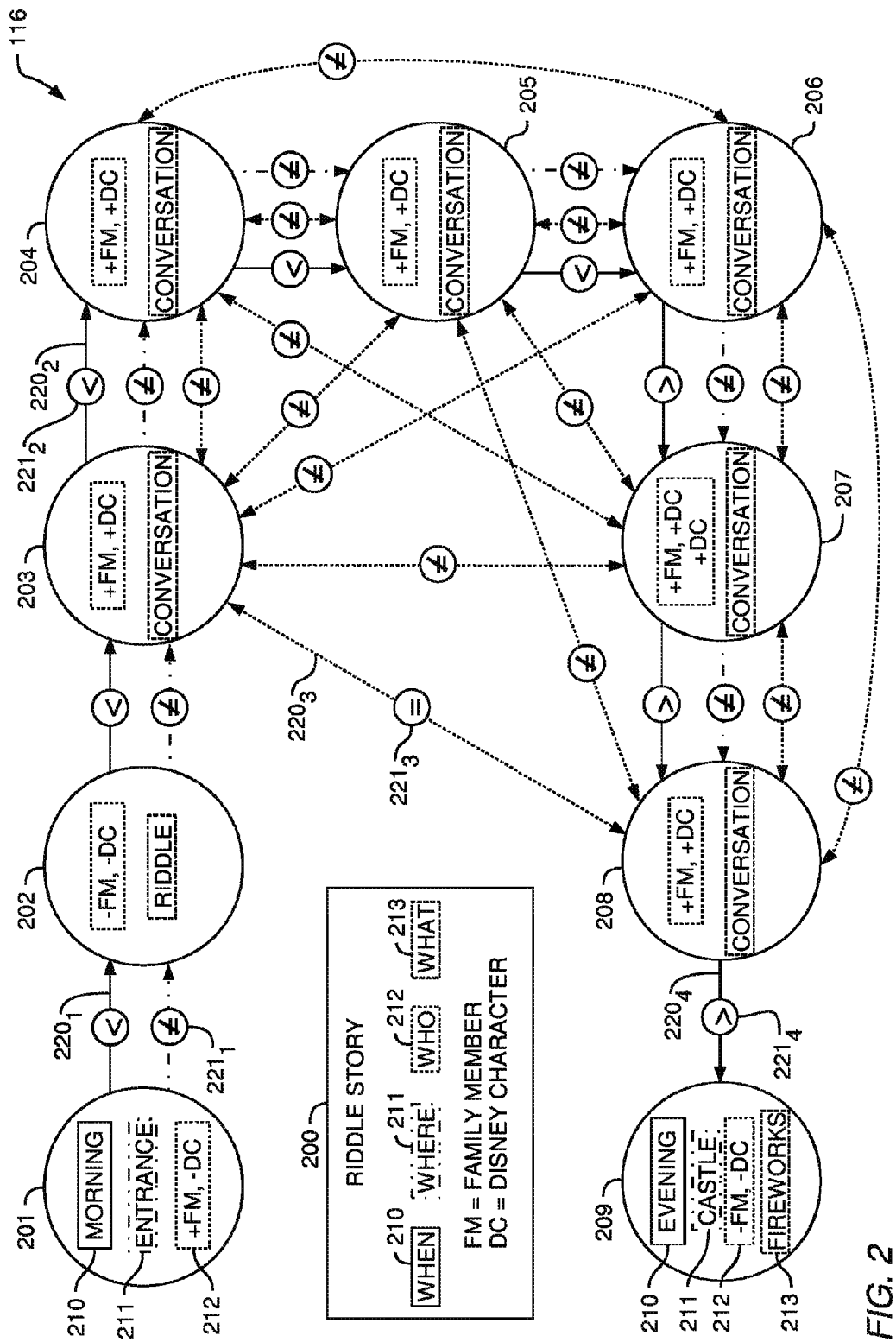
FIG. 2 illustrates a graph that represents a predefined story, according to one embodiment.

FIG. 2 illustrates an example graph 116 representing a predefined story, according to one embodiment. As shown, the graph 116 includes a plurality of nodes 201-209. Each node 201-209 may correspond to a unit (or frame) of a predefined story. For example, each node 201-209 may correspond to a comic book frame, a page of a story book, and the like. Each node 201-209 includes at least one metadata attribute 210-213. As shown in legend 200, attribute 210 corresponds to a "when" attribute specifying when the story frame associated with the respective node occurs, and attribute 211 corresponds to a "where" attribute specifying where the story frame associated with the respective node occurs. Similarly, attribute 212 corresponds with a "who" attribute specifying what people or fictional characters should be present in an image assigned to the respective node, while attribute 213 corresponds to a "what" attribute specifying one or more of an event, topic, or object that is part of the story frame associated with the respective node.

As shown, each node 201-209 includes at least one attribute 210-213. For example, node 201 has a "when" attribute 210 specifying "morning," requiring that an image satisfying this constraint must have a timestamp indicating the image was captured during the morning hours. Further, node 201 includes a "where" attribute 211 defining a requirement that an image assigned to this node must depict an "entrance," such as an entrance to a theme park (or other location). Further still, node 201 specifies a "who" attribute 212 indicating a requirement that a family member must be present (reflected by the +operator) while a fictional character cannot be present (reflected by the −operator) in an image assigned to node 201. In this example, the story application 112 assigns node 201 to an image taken in the morning at the entrance of a theme park which includes at least one family member and no fictional characters. If the story application 112 does not identify an image in the content 117 satisfying these constraints, the story application 112 returns an indication that a story album cannot be generated based on the selected graph 116 and the content 117. However, the story application 112 may attempt to generate a story album using a different graph that is associated with a different predefined story.

Similarly, as shown, node 209 includes attributes 210-213. The "when" attribute 210 indicates that the image must be taken in the evening, while the "where" attribute 211 specifies that the image must include a castle, while the "who" attribute 212 indicates that no people or fictional characters can be present in the image, and the "what" attribute 213 indicates the image must depict fireworks. Again, as described in greater detail below, the story application 112 assigns node 209 only to an image that satisfies each constraint.

As shown, the graph 116 also includes a plurality of edges 220. Not all of the edges 220 are marked for the sake of clarity. Illustratively, an edge may specify a constraint 221. The constraints 221 may specify a constraint relative to a node attribute 210-213. For example, as shown, edge $220_1$ connects nodes 201 and 202, and specifies a constraint $221_1$ indicating that the "where" attribute 211 of nodes 201 and 202 cannot be equal. Stated differently, the constraint $221_1$ requires that the story application 112 assign nodes 201 and 202 to images taken at different locations. Similarly, constraint $221_2$ of edge $220_2$ requires that an image assigned to node 203 must have a "when" attribute 210 that occurs earlier in time than the "when" attribute 210 of node 204. As another example, constraint $221_3$ of edge $220_3$ requires that nodes 203 and 208 each include the family member and fictional character as the respective "who" attribute 212. As another example, edge $220_4$ specifies a constraint $221_2$ requiring that node 209 is assigned to an image that was taken later in time than an image assigned to node 208.

Figure 3:
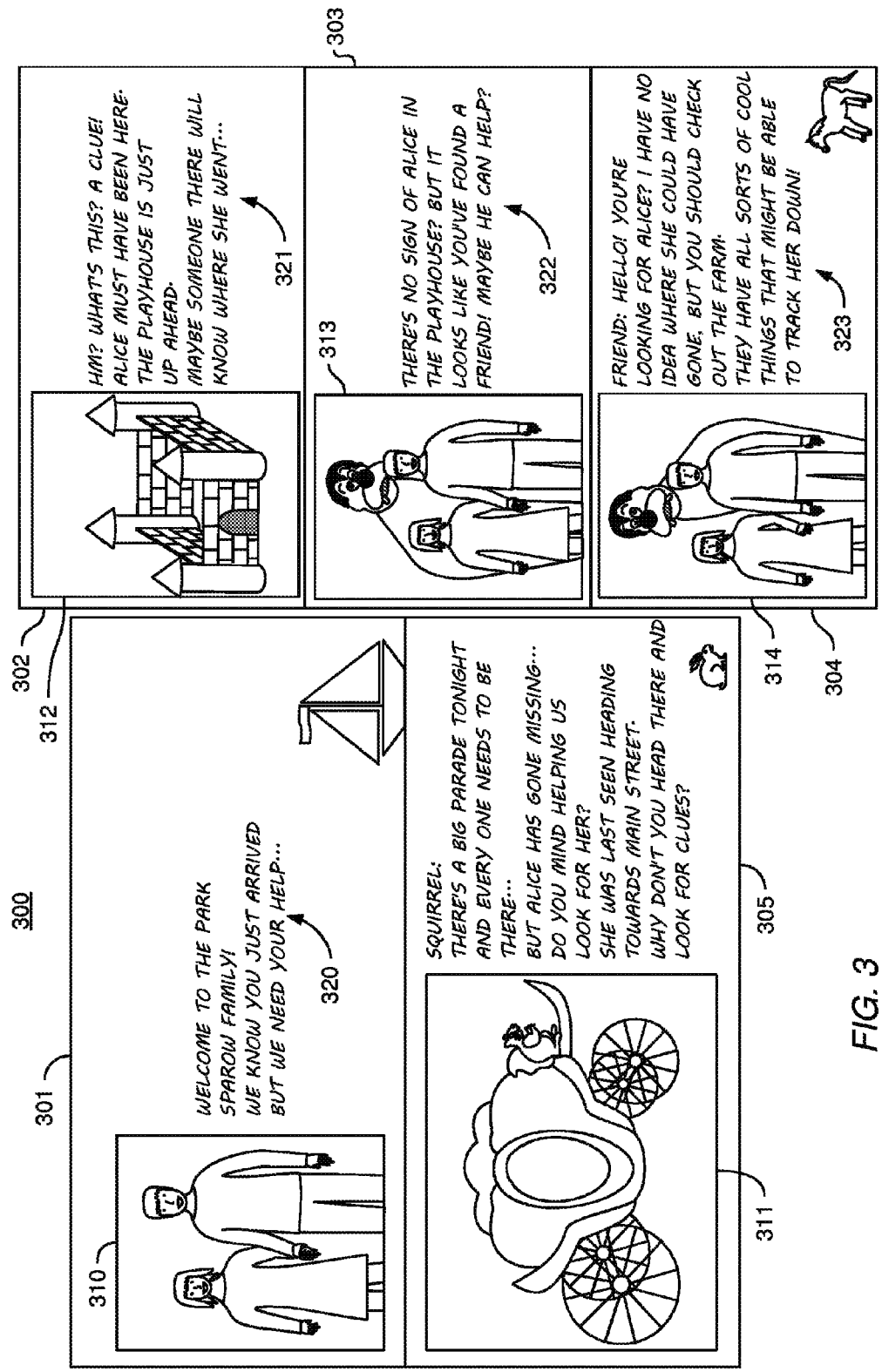
FIG. 3 illustrates an example story album, according to one embodiment.

FIG. 3 illustrates an example story album 300, according to one embodiment. As shown, the example story album 300 includes five frames 301-305. Each frame 301-305 includes a respective image 310-314 and a respective block of text 320-323. The story album 300 may be based on a template 115 which is represented by a graph from the graphs 116. To generate the story album 300, the story application 112 may identify the images 310-314 as meeting the constraints of each node of the graph 116 (where each node is associated with a frame 301-305). The assignment of nodes to images is described in greater detail below. The story application 112 may then assign the nodes of the graph 116 to the images 310-314. The story application 112 may then generate the story album 300 as described in greater detail below.

Figure 4:
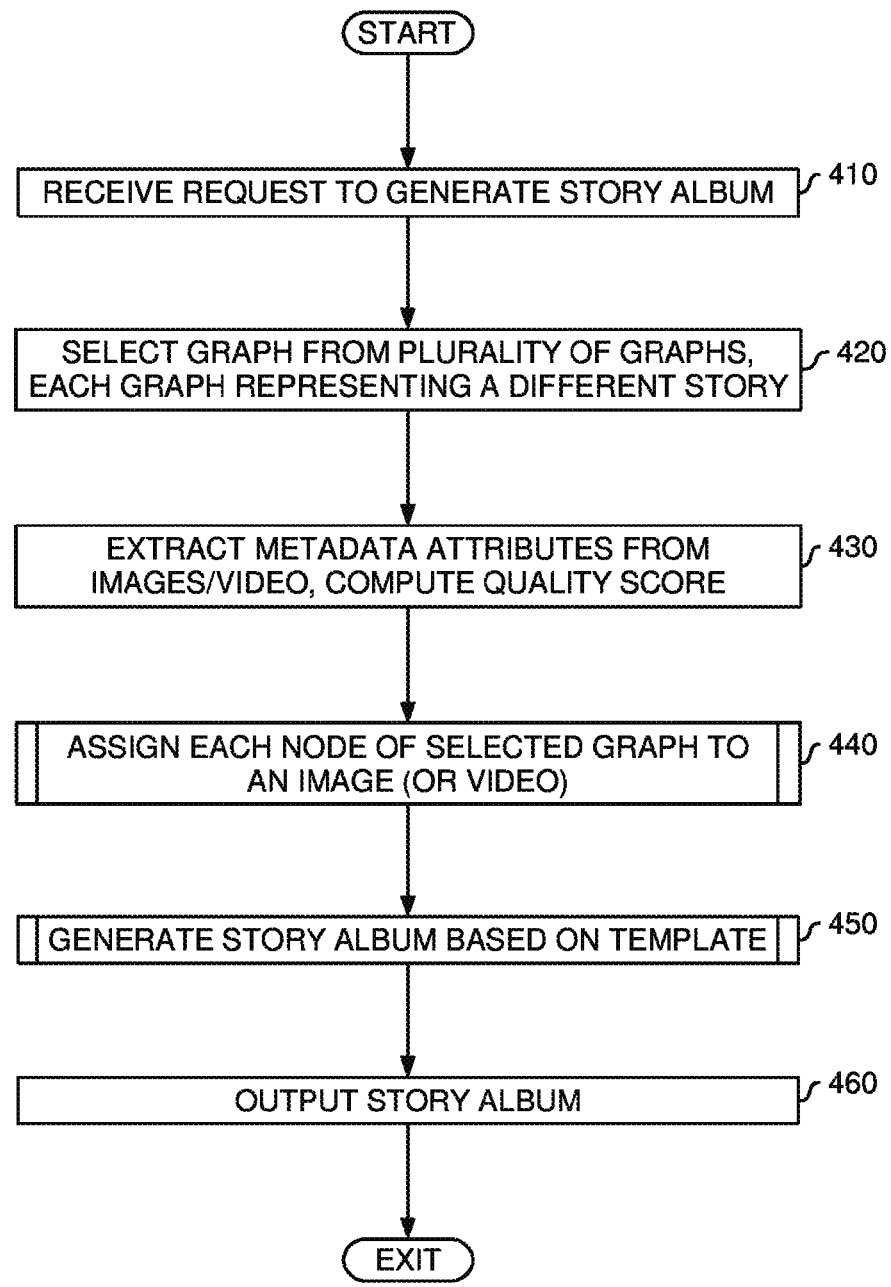
FIG. 4 is a flow chart illustrating a method to create story albums, according to one embodiment.

FIG. 4 is a flow chart illustrating a method 400 to generate story albums, according to one embodiment. Generally, the story application 112 may perform the steps of the method 400 to generate a story album based on a collection of digital images (or other multi-media content). The method 400 begins at step 410, where the story application 112 receives a request to generate a story album. The request may specify a set of images in the content 117 to use as the basis for a story album. At step 420, the story application 112 may select a graph from the graphs 116. Generally, the story application 112 may attempt to create a story for the set of images in the content 117 based on each graph 116. Although some graphs 116 will not work for a given set of images, the story application 112 may select the best graph 116 based on a ranking of how ell each image fits the story, and how the template fits each image. However, if the number of graphs in the graphs 116 is very large, in some embodiments, a user may select a specific story graph 116, or a theme containing several story graphs 116 related to the theme, or the story application 116 may ask the user questions and select a range of graphs 116 based on the user's response to the questions.

At step 430, the story application 112 may extract metadata attributes from the digital images or other multimedia in the content 117. For example, the story application 112 may extract the GPS coordinates and timestamps from each item belonging to the user in the content 117. The story application 112 may use the GPS coordinates to assign the name of the closest landmark or attraction to the photo. For example, if the GPS coordinates of a first photo indicate the nearest attraction in a theme park is the main entrance, the story application 112 may assign the main entrance as a "where" attribute of the photo. The story application 112 may assign the timestamp of the photo as the "when" attribute of the photo. In one embodiment, the story application 112 may convert the timestamp to a part of a day, such as "morning," "afternoon," "evening," and "night." The story application 112 may further analyze the image data of each item of content to identify people and/or fictional characters in the content. For example, using facial recognition techniques, the story application 112 may identify each member of a family and estimate each person's gender and age. Similarly, the story application 112 may use object detection to identify fictional characters, landmarks, buildings, places, events, and the like. The story application 112 may further analyze each item of content in the content 117 based on a number of image characteristics to assess the quality of each item of content. For example, the story application 112 may compute a score for the quality of each image based on one or more of blurriness, lighting conditions, overexposure, underexposure, image composition, and the like. The quality score may be normalized to lie between a range of values, for example 0 for poor quality through 1 for high quality. In addition, the story application 112 may compute a saliency measure for each pixel in each item of content 117.

At step 440, described in greater detail with reference to FIG. 5, the story application 112 may assign each node of the selected graph 116 to a respective image in the content 117. Generally, given a set of N images I, where S={$I_1, \ldots, I_N$}, and a story graph 116 representing an ordered sequence of K frames F, B={F$_1$, ..., F$_N$}, the story application 112 attempts to generate a one-to-one assignment of nodes (frames) to images B→S. The assignment of nodes to frames may be represented as a vector x={x$_1$, ..., x$_K$} of length K where each entry x$_i$ is an integer number representing the index of the photograph assigned to node i (frame F$_i$).

The story application 112 may define the assignment of nodes to images as a form of a constraint satisfaction problem (CSP) using the selected graph 116. As previously indicated, mandatory constraints must be satisfied when assigning nodes to images. However, large sets of input images may create many possible solutions that satisfy the mandatory constraints. In such cases, the story application 112 may rely on permissive constraints and the quality scores of each photograph to evaluate which solution is the best overall solution. To measure the quality of a solution, the story application 112 may define a fitness function that defines the quality of a given solution that satisfies each mandatory constraint.

In at least one embodiment, the story application 112 may need to convert the attributes of the graph 116 to constraints. In one embodiment, the set of all permissive constraints for node i may be defined as soft(i), and the set of all mandatory constraints may be defined as hard(i). In at least one embodiment, all edge constraints may be permissive. The set of permissive edge constraints between node i and node j may be broken into subsets corresponding to specific node attributes. For example, if the attributes are "who," "what," "where," and "when," the edge constraints may be defined as who(i,j),what(i,j),where(i,j), and when(i,j). In one embodiment, E(I$_x$) ∈ {hard(i),soft(i)} may be a binary evaluation function for a constraint generated by a node, and G(I$_x$, I$_y$)∈{who(i,j),what(i,j),where(i,j),when(i,j)} may be a binary constraint function for an edge, where I$_x$, I$_y$ are images. Generally, E(·) may take a binary value of 0 or 1, while G(·,·) may take a value between −1 and 1, depending on if a given constraint is satisfied or not satisfied, respectively. Using negative values to more strongly enforce negative constraints may ensure that solutions that do not satisfy edge relationships are more heavily penalized.

The CSP objective may therefore be defined by the following equation:

$$\zeta(x) = \notin_{i=1}^{K} \zeta_i(x) = \notin_{i=1}^{K} \notin_{E \in hard(i)} E(I_{x_i})$$

For each node i, $\zeta_i(x_i)$ is zero if one or more mandatory constraints are not satisfied, or one if all mandatory constraints are satisfied. All x for which $\zeta(x)=1$ are solutions to the CSP. To rank the solutions, the story application 112 may define a measure of quality of node assignment to a given image, which is based on satisfaction of soft permissive constraints and image quality. Doing so allows the image associated with each node to satisfy as many soft constraints as possible and be of high quality. The measure of quality may be based on the following equation:

$$\varphi_i = w_0 \cdot quality(I_{x_i}) = \frac{(1-w_0)}{\min(|soft(i)|, 10)} \min\left[\sum_{E \in soft(i)} E(I_{x_i}), 10\right]$$

Where quality (I$_{x_i}$) is the quality score of an image, and w$_0$ is a weighting factor between the permissive constraints and the quality of the image. In one embodiment, the weighting factor may be set to w$_0$=0.5. The number of soft constraints may be any number, but in one aspect, as shown, the maximum number of soft constraints that are considered is 10. A measure of quality of edge constraint satisfaction may be defined by the following equation:

$$\psi_{i,j}(x_i, y_i) = \frac{w_1}{\min(|who(i,j)|,3)} \min\left[\sum_{G \in who(i,j)} G(I_{x_i}, I_{x_j}), 3\right] + $$

$$\frac{w_2}{\min(|what(i,j)|,3)} \min\left[\sum_{G \in what(i,j)} G(I_{x_i}, I_{x_j}), 3\right] + $$

$$\frac{w_3}{\min(|where(i,j)|,3)} \min\left[\sum_{G \in where(i,j)} G(I_{x_i}, I_{x_j}), 3\right] + $$

$$\frac{w_4}{\min(|when(i,j)|,3)} \min\left[\sum_{G \in when(i,j)} G(I_{x_i}, I_{x_j}), 3\right]$$

Where who (i,j),what(i,j),where(i,j), and when(i,j) are the permissive constraints for each attribute type on the edge between nodes i and j. The number of constraints counted, as shown, may be limited to 3, but any suitable value may apply. In at least one embodiment, w$_1$=w$_2$=w$_3$=w$_4$=0.25 may be set as a weighting factor between groups. Because G (·,·) may take a negative value when a constraint is not satisfied, $\psi_{i,j}(x_i, y_i)$ may also have a negative value. The story application 112 may define an equation for the overall fitness function for the assignment of x nodes to images of the entire story as:

$$fitness(x) = \frac{1}{|V|}\sum_{i \in V} \varphi_i(x_i) + \frac{1}{|E|}\varphi_{i,j}(x_i, y_i)$$

The number of possible assignments of nodes to images is exponential. Therefore, the story application 112 may not check all possible solutions, and may therefore leverage a heuristic search algorithm to find a solution that satisfies all the mandatory constraints and has the highest "fitness." In at least one embodiment, the story application 112 may apply an algorithm that combines CSP techniques with a stochastic search using a two-stage approach. In many cases, the hard constraints in the graph combined with a given set of images in the content 117 limit the possible assignment of specific nodes to a single image. Such nodes may be considered "strongly constrained" herein. In the first stage, therefore, the story application 112 may implement topological sorting to find any strongly-constrained nodes (nodes where only one image satisfies all hard constraints). The story application 112 may then remove the strongly-constrained nodes from the second stage. In the second stage, the story application 112 implements a stochastic search where each internal search step uses a CSP algorithm that combines a random factor to escape the local minimal of the fitness equation above. The first stage is described in greater detail with reference to FIG. 6, while the second stage is described in greater detail with reference to FIG. 7.

In one embodiment, the story application 112 may further specify the assignment of characters in an image to entities in a given story. For example, each image may have more than one character that satisfies the constraints of a given node (e.g., two family members or two fictional characters where only one person or character is defined as a mandatory constraint). In such cases, the story application 112 may, while assigning nodes to images, implement an additional stage of assigning specific characters to story entities so that the story application 112 may calculate the values of node/edge constraints. To evaluate the fitness of an assignment, the story application 112 may exhaustively try all possibilities of assigning each character in each photograph to story entities of the node the image is assigned to, and evaluate the fitness for all combinations, returning the most fit combination. Since the fitness value is normalized by the number of nodes and edges, the fitness equation above provides a way to compare the assignment of the same image collection to different stories, allowing the story application 112 to pick the best story that fits a given collection of images.

At step 450, described in greater detail with reference to FIG. 8, the story application 112 may generate a story album based on a template. Generally, once the story application 112 assigns each node to images and maps characters to story entities, the story application 112 creates the visual representation of the story (the story album) by choosing the best partitioning of the story to templates 115, and choosing the best template 115. At step 460, the story application 112 may output the story album. In at least one embodiment, the story application 112 may store the story album in the storage 108 for later retrieval. In addition, the story application 112 may transmit the story album (or a link thereto) to a user via the network 130.

Figure 5:
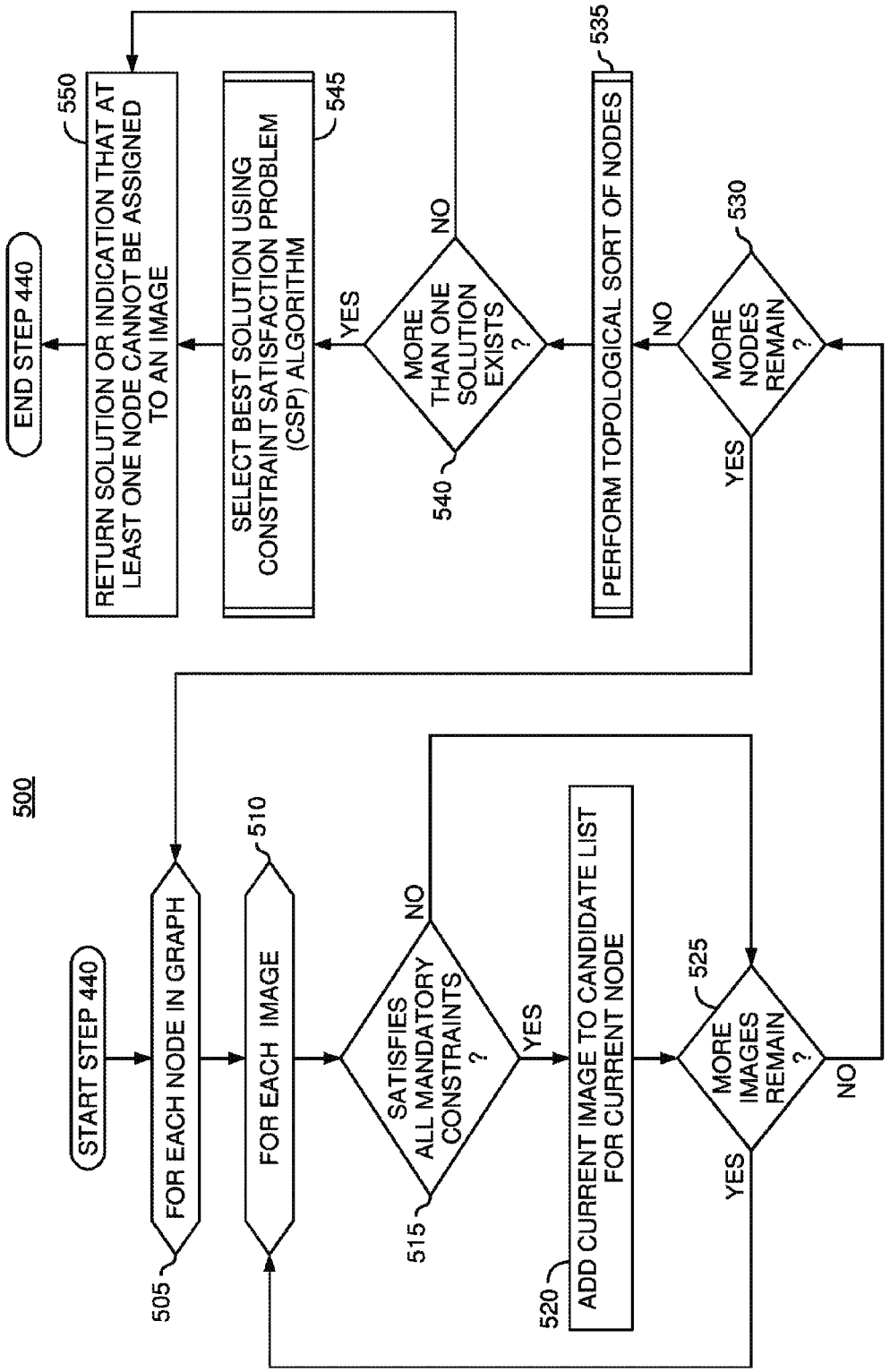
FIG. 5 is a flow chart illustrating a method to assign each node of a graph to an image, according to one embodiment.

FIG. 5 is a flow chart illustrating a method 500 corresponding to step 440 to assign each node of a graph to an image, according to one embodiment. As shown, the method 500 begins at step 505, where the story application 112 may execute a loop including steps 510-530 for each node in the selected story graph 116. At step 510, the story application 112 may execute a loop including steps 515-525 for each image in the content 117 received as input from the user. At step 515, the story application 112 may determine whether the current image satisfies all mandatory constraints of the current node. If the current image satisfies all mandatory constraints (e.g., $\zeta(x)=1$ for the current image), the story application 112 proceeds to step 520, where the story application 112 adds the current image to a candidate list of images for the current node. If the current image does not satisfy all mandatory constraints of the current node (for example, the current image was taken during the evening, when a mandatory constraint specifies the image must be taken in the morning), the story application 112 proceeds to step 525. At step 525, the story application 112 determines whether more images remain. If more images remain, the story application 112 returns to step 510. If no more images remain to be considered relative to the mandatory constraints of the current node, the story application 112 proceeds to step 530. At step 530, the story application 112 determines whether more graph nodes remain. If more graph nodes remain, the story application 112 returns to step 505. If no more nodes remain, the story application 112 proceeds to step 535.

At step 535, described in greater detail with reference to FIG. 6, the story application 112 may perform a topological sort of nodes. Generally, at step 535, the story application 112 finds the set of nodes that are strongly constrained by sorting the nodes in a priority queue based on the number of images in the set of candidate images for each node. Therefore, the lower the number of candidate images, the higher the priority of a given node. At step 540, the story application 112 determines whether more than one solution exists for assigning nodes to images. If more than one solution exists, the story application 112 proceeds to step 545. If zero or one solutions exist, the story application 112 proceeds to step 550. At step 545, described in greater detail with reference to FIG. 7, the story application 112 selects the best solution for assignment of nodes to images using a CSP algorithm. At step 550, the story application 112 has determined that zero or one solutions exist. If zero solutions exist, this means that there is at least one node for which no image satisfied all mandatory constraints of the node, and the story application 112 may return an indication that at least one node cannot be assigned to an image, and that a story album based on the current template cannot be generated. If one solution exists, the story application 112 returns the solution.

Figure 6:
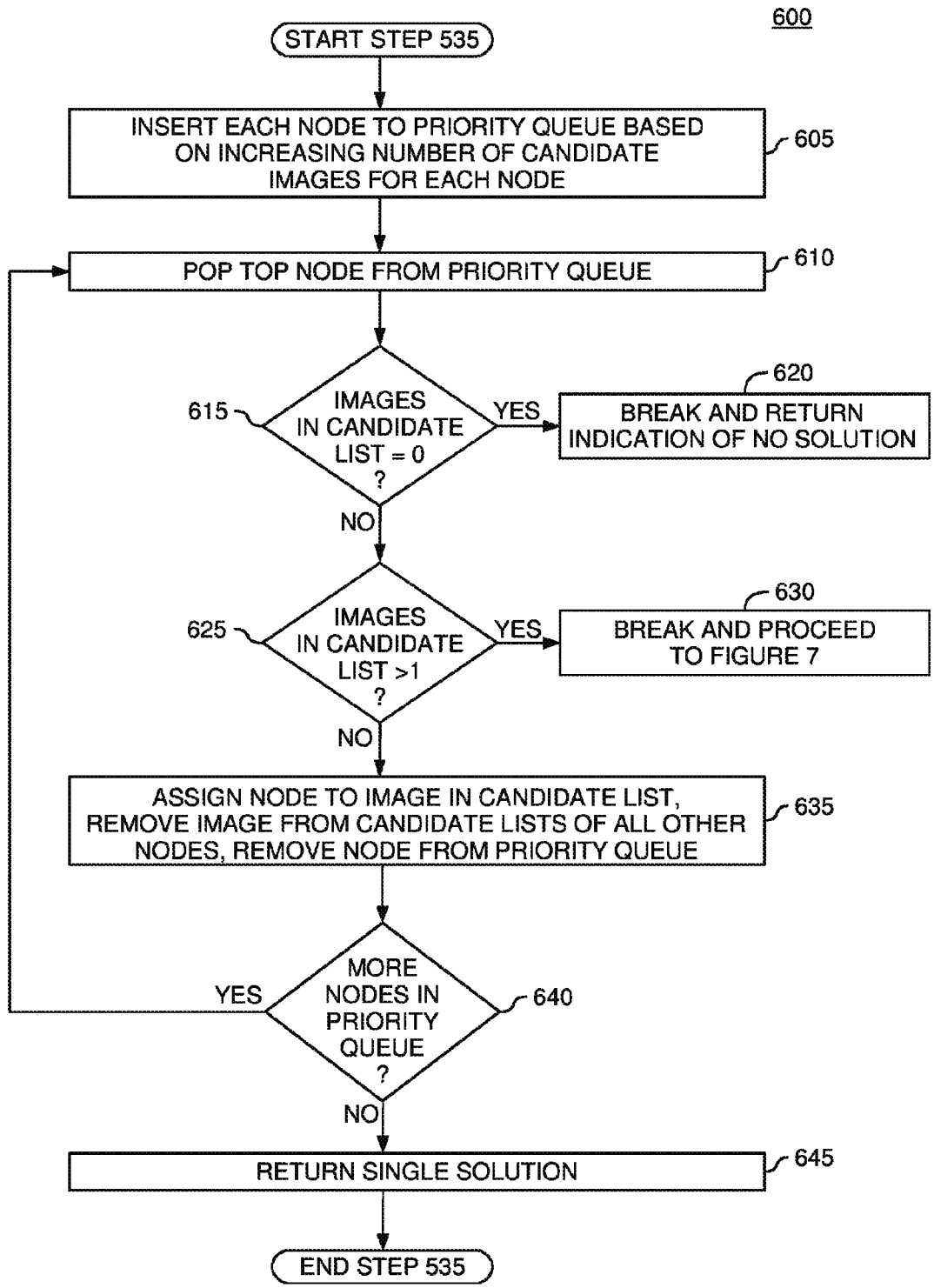
FIG. 6 is a flow chart illustrating a method to perform a topological sort of graph nodes, according to one embodiment.

FIG. 6 is a flow chart illustrating a method 600 corresponding to step 535 to perform a topological sort of graph nodes, according to one embodiment. As shown, the method 600 begins at step 605, where the story application 112 inserts each node into a priority queue of nodes based on an increasing number of candidate images in the candidate list for each node. As previously indicated, the lower the number of candidate images, the higher the priority of the node. Therefore, a node having two candidate images will be placed higher in the priority queue of nodes than a node having three candidate images. At step 610, the story application 112 may pop the top node from the priority queue. At step 615, the story application 112 may determine whether the number of candidate images in the candidate list of images for the current node equals zero. If the number of candidate images in the candidate list of images for the current node equals zero, the node cannot be assigned to an image, and the story application 112 proceeds to step 620. At step 620, the story application 112 may break from the method 600 and return an indication that no solution can be returned, as the current node cannot be assigned to an image.

Returning to step 615, if the number of images in the candidate list is greater than zero, the story application 112 proceeds to step 625. At step 625, the story application 112 may determine whether the number of candidate images in the list of candidate images for the current node is greater than one. Stated differently, the story application 112 determines whether the current node can be assigned to more than one image. If so, the story application 112 proceeds to step 630, where the story application selects an image from the multiple candidates, discussed in detail relative to FIG. 7. Otherwise, i.e., when a single candidate image is matched to the current node, the story application 112 assigns the current node to the candidate image (step 635); namely, the one image in the list of candidate images for the current node). At step 640, the story application 112 determines whether more nodes exist in the queue of nodes. If so, the method returns to step 610 where the story application 112 selects a new current node and evaluates the available images. If no nodes remain in the queue, the story application 112 proceeds to step 645. If the story application 112 reaches step 645, a single solution exists for assigning nodes to images, and the story application 112 returns the single solution.

FIG. 7 is a flow chart illustrating a method 700 corresponding to step 545 to select a best solution for assigning nodes to images, according to one embodiment. Generally, the story application 112 performs the steps of the method 700 when more than one solution for assigning a given node to images is identified. The method 700 begins at step 705, where the story application 112 executes a loop including steps 715-750 for each possible solution. At step 710, the story application 112 scores each node of the story graph 116 based on one or more of: the mandatory constraints of each node, the permissive constraints of each node, the incoming constraints on each node, and the number of candidate images in the candidate list of images for each node. In at least one embodiment, the story application 112 scores each node i at step 710 based on the following equation:

$$f(i, t) = a\left(1 - \frac{|C_i|}{\max_i |C_i|}\right) + (1 - a)\frac{inDegree(i)}{\max_i \ inDegree(i)} + n(t)$$

Where $C_i$ is the candidate list of images for node i, a is a weighting factor (0.5 in one embodiment), and n(t) is a random factor that depends on the number of loops t $\left(\text{the random factor may be a random value between 0 and } 1 - \left(\frac{t}{\text{maximum loops}}\right)^2\right).$ The score computed at step 710, therefore, favors nodes that have fewer candidates in their candidate list of images $C_i$ and fewer incoming constraints from other nodes.

At step 715, the story application 112 may add the nodes to a priority queue based on the score computed at step 710, where nodes having fewer candidate images in their list of candidate images are placed higher in the priority queue. At step 720, the story application 112 may pop the top node from the priority queue. At step 725, the story application 112 may determine whether the candidate list of images for the current node is empty. If the list is empty, the current node cannot be assigned to an image, and the story application 112 proceeds to step 725, where the story application 112 returns an indication that the current solution is not a viable solution. The story application 112 may then proceed to step 750.

Returning to step 725, if the list of candidate images for the current node is not empty, the story application 112 proceeds to step 735, where the story application 112 assigns the image having the highest fitness measure from the candidate list of images for the current node to the current node. The story application 112 may also remove the selected image from the candidate list of images for all other nodes. In at least one aspect, the quality score for the images in the list of candidate images may be based on the fitness measure, which, as previously indicated, may be computed based on the following equation:

$$\varphi_i = w_0 \cdot \text{quality}(I_{x_i}) = \frac{(1 - w_0)}{\min(|\text{soft}(i)|, 10)} \min\left[\sum_{E \in \text{soft}(i)} E(I_{x_i}), 10\right]$$

At step 740, the story application 112 determines whether more nodes remain in the queue. If more nodes remain, the story application 112 returns to step 720. If no more nodes remain, the story application 112 proceeds to step 745, where the story application 112 scores the current solution according to overall fitness. The story application 112 may use the following equation at step 745 to compute a fitness score for the current solution:

$$\text{fitness}(x) = \frac{1}{|V|}\sum_{i \in V}\varphi_i(x_i) + \frac{1}{|E|}\varphi_{i,j}(x_i, y_i)$$

At step 750, the story application 112 determines whether more solutions remain. If more solutions remain, the story application 112 returns to step 705. If no more solutions remain, the story application 112 proceeds to step 755, where the story application 112 returns the solution having the highest fitness score as the solution for assigning graph nodes to images.

In one embodiment, the story application 112 may perform the steps of the method 700 multiple times (for example, 10,000 times) to lower the randomness by comparing each solution to a current best solution at each iteration. The story application 112 may ultimately return the solution with the best fitness found, or an empty solution if none is found.

Figure 8A:
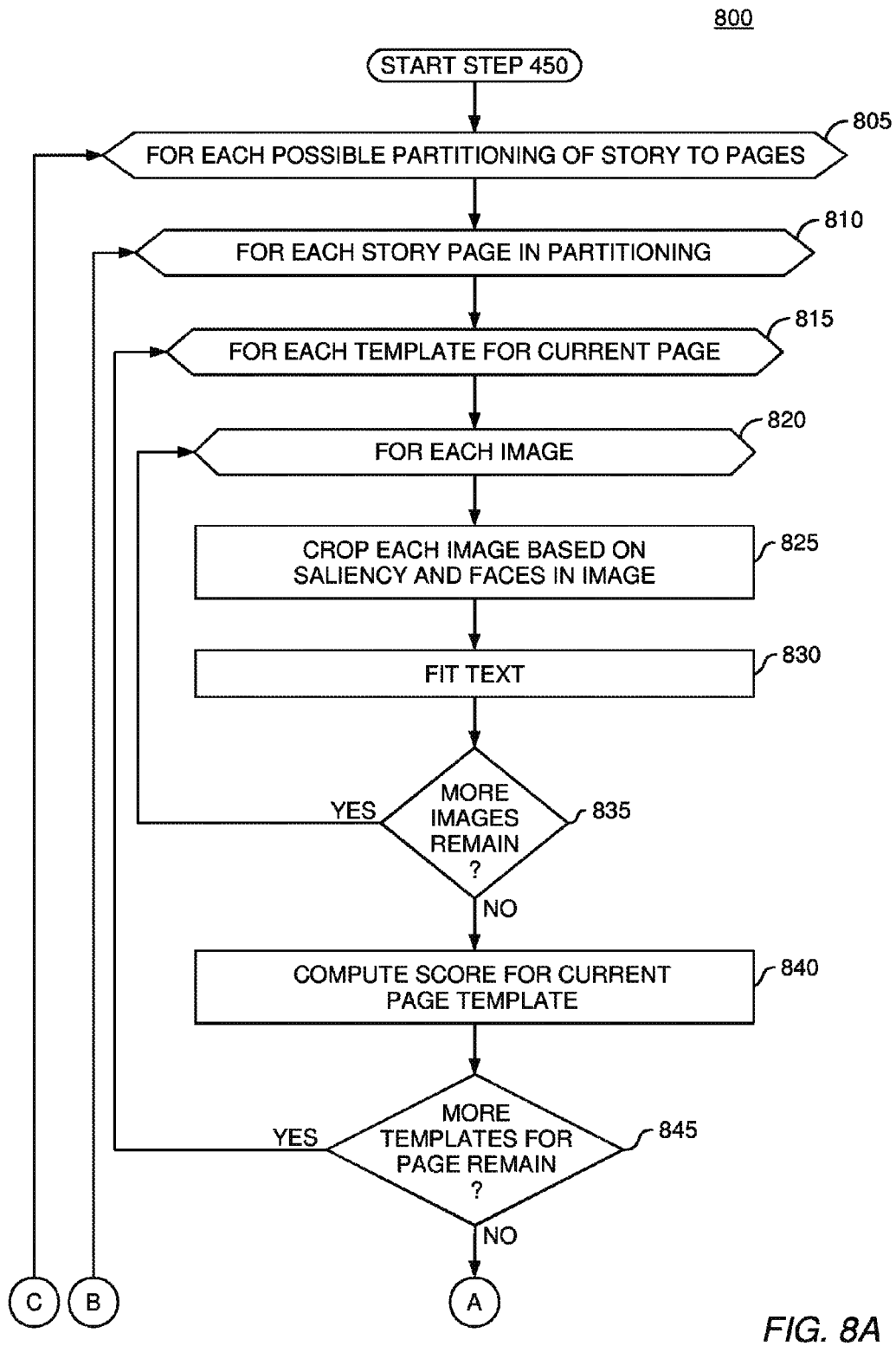
FIGS. 8A-8B are a flow chart illustrating a method to generate a story album, according to one embodiment.
Figure 8B:
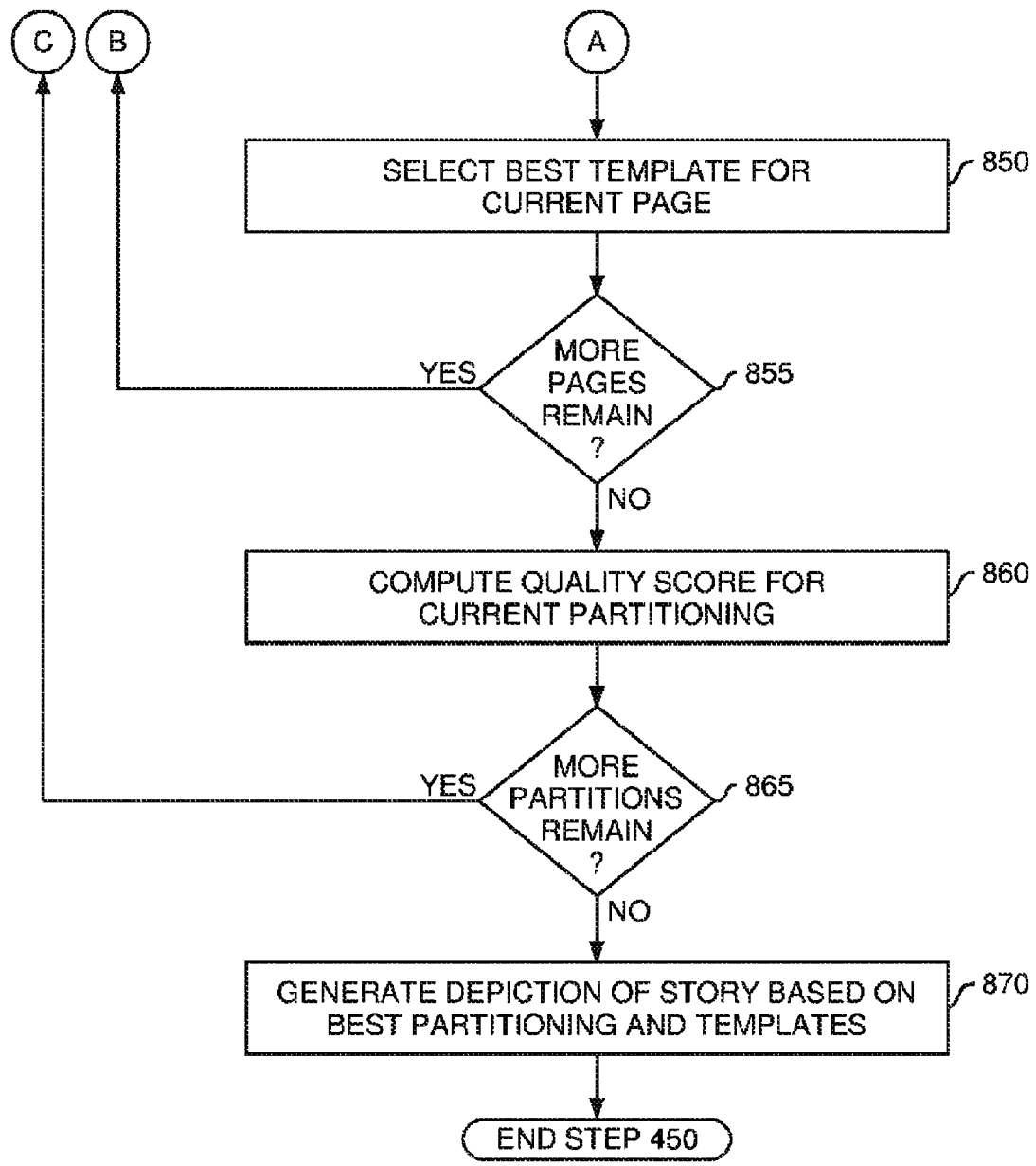

FIGS. 8A-8B depict a flow chart illustrating a method 800 to generate a story album, according to one embodiment. Method 800 generally corresponds to step 450 of method 400 from FIG. 4. Once the story application 112 has assigned all nodes in the story graph 116, the story application 112 may create output that is returned to the user. As indicated, the assignment vector $x = \{x_1, \ldots, x_K\}$ provides an ordered sequence of photographs $I_{x_1}, \ldots, I_{x_K}$ that should be displayed in their specified order along with the text stored at their respective nodes in the graph 116. While the story application 112 may render the final output by displaying each image on a page and placing text near the image, the story application 112 may generate more complex layouts based on templates 115 that display several images on a given page. The templates 115 may have different numbers, dimensions, or positions of images and/or text on a given page. When assigning a subset of images on a page (which may have multiple frames, each frame configured to represent a placeholder for an image), the story application 112 may crop the image to match the dimensions of a respective frame, and fit the text belonging to the image's node to the text box, as reflected in FIG. 3.

As shown in FIG. 8A, the method 800 begins at step 805, where the story application 112 executes a loop including steps 810-865 for each possible partitioning of the story to pages. Generally, the story application 112 may partition the frames in a template to any of the $2^{n-1}$ subsequences for a set of n images. At step 810, the story application 112 may execute a loop including steps 815-855 for each page in the partitioning of a story to pages. At step 815, the story application 112 executes a loop including steps 820-845 for each template 115 for a given page in the partitioning. At step 820, the story application 112 executes a loop including steps 825-835 for each image in the current page template 115.

At step 825, the story application 112 may crop each image based on pixel saliency and the presence of faces in the image. In one embodiment, the story application 112 may crop the image in a single dimension—either width or height—to match the aspect ratio of a frame in the template 115. The story application 112 may select the dimension for cropping based on the saliency map of the pixels of the image and the faces detected in the image. In one embodiment the story application 112 uses the following equation to determine the best cropping window for a photograph:

$$\text{FitValue}(I) = \max(I')(\beta\frac{\text{Saliency}(I')}{\text{Saliency}(I)} + (1 - \beta)\frac{\text{Faces}(I')}{\text{Faces}(I)}$$

Where I' is the cropped part of a photograph, Saliency(I) is the sum of saliency values of all pixels in the image, Faces(I) is the number of pixels belonging to a bounding boxes of the faces detected in image I, and β is a weighting factor between the two factors (in one embodiment, β=0.2).

At step 830, the story application 112 may process and fit the text to the current image. For example, the story application 112 may supply values for variables in the text of each node. As previously indicated, each node in the graph 116 includes a text segments that describes the event happening in that node. Because the actual participants and places are not known until the node is assigned to an image, the text contains replaceable elements that are determined by the image. For example, the text segment may specify "My new friend @person and I went to @currentlocation." The story application 112 may replace items starting with the @ symbol with a specific text value, such as a person's name for @person, and a real-world location for @currentlocation. The story application 112 may replace such items with metadata from the image assigned to the respective node. Therefore, the story application 112 may modify the example text to read "My new friend Joey and I went to the amusement park."

Additionally, the story application 112 may optionally select a font size for the text in lieu of a default font size. The story application 112 may select a different font size to properly fill the text box. In one embodiment, the story application 112 may set a default font size df as 10% of the template size, with a minimum value of 10, and a maximum value of 50. The story application 112 may then measure the ratio between the text height and the box height. If the ratio is greater than 1, the story application 112 may reduce the font size until the ratio is less than 1. In one embodiment, the story application 112 may then compute a quality of fitting the text segment to the text box by the following equation:

$$textFit(I_i) = \begin{cases} 1 & \text{if } s = ds \text{ and } 1 > R > \frac{2}{3} \\ R \cdot \frac{3}{2} & \text{if } s = ds \text{ and } 1 > R < \frac{2}{3} \\ 1 - \frac{s-10}{ds-10} & \text{if } s \neq ds \end{cases}$$

At step 835, the story application 112 determines whether more images remain in the current page template. If more images remain, the story application 112 returns to step 820. Otherwise, the story application 112 proceeds to step 840, where the story application 112 computes a quality score for the current page template. In at least one embodiment, the story application 112 may use the following equation to compute the quality of a layout using the images applied to a template T with n frames:

$$quality(T, I_1, \ldots, I_n) = \omega_c \left(\frac{1}{\max(n)}\right)^2 + \omega_f \left(\frac{1}{n}\sum_{i=1}^{n} fitValue(I_i)\right) + \omega_t \left(\frac{1}{n}\sum_{i=1}^{n} textFit(I_i)\right) + \omega_o \left(\frac{1}{n}\sum_{i=1}^{n} Orientation(I_i)\right)$$

Where the first term favors templates with larger number of frames to allow diversity in results, and max(n) is the maximum number of frames on a page. The second term may be the average fit value of the images to the frames. The third term may be the average text fit value to the boxes, and the fourth term may be the orientation compatibility of the images to frames, which is defined as 1 if both have the same orientation (vertical, horizontal, or square), or 0 otherwise. In at least one embodiment, $\omega_c$=0.1, $\omega_f$=0.5, $\omega_t$=0.2, and $\omega_o$=0.2 The equation therefore produces a quality score between 0 and 1 for fitting images to every page template, independent of the number of images in the template.

At step 845, the story application 112 may determine whether more templates remain for the current page. If more templates for the current page remain, the story application 112 returns to step 815, otherwise, the story application 112 proceeds to step 850, depicted in FIG. 8B. At step 850, the story application 112 may select the template having the highest quality score computed at step 840. At step 855, the story application 112 determines whether more pages remain in the current partitioning. If more pages remain, the story application 112 returns to step 810 (FIG. 8A). Otherwise, the story application 112 proceeds to step 860, where the story application 112 computes a quality score for the current partitioning. In at least one embodiment, the story application 112 computes the quality score for the current partitioning by summing all quality scores for each page computed at step 840. At step 865, the story application 112 determines whether more partitions for the story. If more partitions remain, the story application 112 returns to step 805 (FIG. 8A). Otherwise, the story application 112 proceeds to step 845, where the story application 112 selects the best partitioning and templates and generates the depiction of the story (e.g., the story album) using the selected partitioning and templates.

In the foregoing, reference is made to embodiments of the invention. However, it should be understood that the invention is not limited to specific described embodiments. Instead, any combination of the recited features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the story application 112 could execute on a computing system in the cloud and generate story albums. In such a case, the story application 112 could generate the story albums and store the generated story albums at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
assigning each of a plurality of nodes of a graph to a distinct image, of a plurality of images including a first image and a second image, wherein the graph represents a story, wherein each node corresponds to a respective element of the story, wherein each node comprises: (i) an attribute and (ii) a predefined text of the respective element of the story, wherein a first edge of a plurality of edges of the graph specifies a constraint between the attributes of a first node and a second node of the plurality of nodes, wherein the plurality of nodes are assigned based on an attribute of each of the plurality of images and the attribute of each node, wherein the first and second nodes are assigned to the first and second images, respectively, based on the attributes of the first and second images satisfying the constraint specified by the first edge; and
generating a visual depiction of the story, wherein the visual depiction comprises an ordered representation of each of the distinct images and the predefined text of each respective element of the story.

2. The method of claim 1, wherein the attribute of each node is selected from the group comprising: (i) at least one person present in the respective element of the story, (ii) a location where the respective element of the story occurred, (iii) a time when the respective element of the story occurred, and (iv) a subject of the respective element of the story, wherein the at least one person comprises at least one of: (i) a real person, and (ii) a fictional character, wherein the attribute of each of the images comprises one or more of: (i) at least one person present in the respective image, (ii) a location where the respective image was captured, and (iii) a time when the respective image was captured.

3. The method of claim 2, wherein the first edge connects the first node and the second node, wherein the constraint comprises a mandatory constraint, wherein assigning each the first node to the first image further comprises:
identifying a first set of images having the attribute satisfying the mandatory constraint of the attribute of the first node;
upon determining that the first set of images comprises the first image:
assigning the first node to the first image; and
removing the first image from consideration for assignment to the remaining nodes.

4. The method of claim 1, wherein a third node of the plurality of nodes further specifies one or more permissive constraints for the attribute of the third node, wherein assigning each node to an image further comprises:
identifying a first set of images having an attribute satisfying at least one of the permissive constraints of the attribute of the third node;
upon determining that the first set of images comprises at least two images:
computing a fitness score for each image in the first set of images, wherein the fitness score is based at least in part on: (i) a quality of each respective image in the first set of images, and (ii) a number of permissive constraints satisfied by the respective image in the first set of images;
creating a priority queue comprising each node that has not been assigned to an image, including the third node, wherein the priority queue is ordered based at least in part on a number of images in a set of images matching a set of mandatory constraints for the respective node;
extracting the third node from the priority queue; and
assigning the third node to a first image from the first set of images for the third node, wherein the fitness score of the first image is the highest fitness score relative to the fitness scores of the remaining images in the set of images for the third node.

5. The method of claim 1, wherein the visual depiction is generated based on a layout template, wherein the predefined text of each respective element of the story comprises a variable, wherein the layout template comprises a frame for each distinct image, wherein generating the visual depiction comprises:
cropping each distinct image to fit a respective frame of the layout template, wherein each distinct image is cropped based on a number of faces in the image and a saliency map of the image;
replacing the variable in the predefined text of each respective element of the story with the attribute of the distinct image the respective node has been assigned to; and
determining a number of distinct images to display on each page of the layout template.

6. The method of claim 1, wherein the graph is a first graph of a plurality of graphs, each graph comprising a respective set of nodes, the method further comprising:
upon determining that a third node of the first graph cannot be assigned to a distinct image:
selecting a second graph of the plurality of graphs;
assigning each node of the second graph to a distinct image of the plurality of images; and
generating a visual depiction of a second story represented by the second graph.

7. The method of claim 1, wherein the graph comprises a multi-graph, wherein the attribute of each image is determined based on at least one of: (i) global positioning system (GPS) coordinates of each image, (ii) a timestamp of each image, (iii) facial recognition algorithms, and (iv) user defined values, the method further comprising outputting the generated visual depiction of the story.

8. A system, comprising:
a processor; and
a memory containing a program which when executed by the processor performs an operation comprising:
assigning each of a plurality of nodes of a graph to a distinct image, of a plurality of images including a first image and a second image, wherein the graph represents a story, wherein each node corresponds to a respective element of the story, wherein each node comprises: (i) an attribute and (ii) a predefined text of the respective element of the story, wherein a first edge of a plurality of edges of the graph specifies a constraint between the attributes of a first node and a second node of the plurality of nodes, wherein the plurality of nodes are assigned based on an attribute of each of the plurality of images and the attribute of each node, wherein the first and second nodes are assigned to the first and second images, respectively, based on the attributes of the first and second images satisfying the constraint specified by the first edge; and
generating a visual depiction of the story, wherein the visual depiction comprises an ordered representation of each of the distinct images and the predefined text of each respective element of the story.

9. The system of claim 8, wherein the attribute of each node is selected from the group comprising: (i) at least one person present in the respective element of the story, (ii) a location where the respective element of the story occurred, (iii) a time when the respective element of the story occurred, and (iv) a subject of the respective element of the story, wherein the at least one person comprises at least one of: (i) a real person, and (ii) a fictional character, wherein the attribute of each of the images comprises one or more of: (i) at least one person present in the respective image, (ii) a location where the respective image was captured, and (iii) a time when the respective image was captured.

10. The system of claim 9, wherein the first edge connects the first node and the second node, wherein the constraint comprises a mandatory constraint, wherein assigning each the first node to the first image further comprises:
identifying a first set of images having the attribute satisfying the mandatory constraint of the attribute of the first node;
upon determining that the first set of images comprises the first image:
assigning the first node to the first image; and
removing the first image from consideration for assignment to the remaining nodes.

11. The system of claim 8, wherein a third node of the plurality of nodes further specifies one or more permissive constraints for the attribute of the third node, wherein assigning each node to an image further comprises:
identifying a first set of images having an attribute satisfying at least one of the permissive constraints of the attribute of the third node;
upon determining that the first set of images comprises at least two images:
computing a fitness score for each image in the first set of images, wherein the fitness score is based at least in part on: (i) a quality of each respective image in the first set of images, and (ii) a number of permissive constraints satisfied by the respective image in the first set of images;
creating a priority queue comprising each node that has not been assigned to an image, including the third node, wherein the priority queue is ordered based at least in part on a number of images in a set of images matching a set of mandatory constraints for the respective node;
extracting the third node from the priority queue; and
assigning the third node to a first image from the first set of images for the third node, wherein the fitness score of the first image is the highest fitness score relative to the fitness scores of the remaining images in the set of images for the third node.

12. The system of claim 8, wherein the visual depiction is generated based on a layout template, wherein the predefined text of each respective element of the story comprises a variable, wherein the layout template comprises a frame for each distinct image, wherein generating the visual depiction comprises:
cropping each distinct image to fit a respective frame of the layout template, wherein each distinct image is cropped based on a number of faces in the image and a saliency map of the image;
replacing the variable in the predefined text of each respective element of the story with the attribute of the distinct image the respective node has been assigned to; and
determining a number of distinct images to display on each page of the layout template.

13. The system of claim 8, wherein the graph is a first graph of a plurality of graphs, each graph comprising a respective set of nodes, the operation further comprising:
upon determining that a third node of the first graph cannot be assigned to a distinct image:
selecting a second graph of the plurality of graphs;
assigning each node of the second graph to a distinct image of the plurality of images; and
generating a visual depiction of a second story represented by the second graph.

14. The system of claim 8, wherein the graph comprises a multi-graph, wherein the attribute of each image is determined based on at least one of: (i) global positioning system (GPS) coordinates of each image, (ii) a timestamp of each image, (iii) facial recognition algorithms, and (iv) user defined values, the method further comprising outputting the generated visual depiction of the story.

15. A non-transitory computer readable medium storing instructions, which, when executed by a processor, perform an operation comprising:
assigning each of a plurality of nodes of a graph to a distinct image, of a plurality of images including a first image and a second image, wherein the graph represents a story, wherein each node corresponds to a respective element of the story, wherein each node comprises: (i) an attribute and (ii) a predefined text of the respective element of the story, wherein a first edge of a plurality of edges of the graph specifies a constraint between the attributes of a first node and a second node of the plurality of nodes, wherein the plurality of nodes are assigned based on an attribute of each of the plurality of images and the attribute of each node, wherein the first and second nodes are assigned to the first and second images, respectively, based on the attributes of the first and second images satisfying the constraint specified by the first edge; and
generating a visual depiction of the story, wherein the visual depiction comprises an ordered representation of each of the distinct images and the predefined text of each respective element of the story.

16. The computer readable medium of claim 15, wherein the attribute of each node is selected from the group comprising: (i) at least one person present in the respective element of the story, (ii) a location where the respective element of the story occurred, (iii) a time when the respective element of the story occurred, and (iv) a subject of the respective element of the story, wherein the at least one person comprises at least one of: (i) a real person, and (ii) a fictional character, wherein the attribute of each of the images comprises one or more of: (i) at least one person present in the respective image, (ii) a location where the respective image was captured, and (iii) a time when the respective image was captured.

17. The computer-readable medium of claim 16, wherein the first edge connects the first node and the second node, wherein the constraint comprises a mandatory constraint, wherein assigning each the first node to the first image further comprises:
identifying a first set of images having the attribute satisfying the mandatory constraint of the attribute of the first node;
upon determining that the first set of images comprises the first image:
assigning the first node to the first image; and
removing the first image from consideration for assignment to the remaining nodes.

18. The computer-readable medium of claim 15, wherein a third node of the plurality of nodes further specifies one or more permissive constraints for the attribute of the third node, wherein assigning each node to an image further comprises:
    identifying a first set of images having an attribute satisfying at least one of the permissive constraints of the attribute of the third node;
    upon determining that the first set of images comprises at least two images:
        computing a fitness score for each image in the first set of images, wherein the fitness score is based at least in part on: (i) a quality of each respective image in the first set of images, and (ii) a number of permissive constraints satisfied by the respective image in the first set of images;
        creating a priority queue comprising each node that has not been assigned to an image, including the third node, wherein the priority queue is ordered based at least in part on a number of images in a set of images matching a set of mandatory constraints for the respective node;
        extracting the third node from the priority queue; and
        assigning the third node to a first image from the first set of images for the third node, wherein the fitness score of the first image is the highest fitness score relative to the fitness scores of the remaining images in the set of images for the third node.

19. The computer-readable medium of claim 15, wherein the visual depiction is generated based on a layout template, wherein the predefined text of each respective element of the story comprises a variable, wherein the layout template comprises a frame for each distinct image, wherein generating the visual depiction comprises:
    cropping each distinct image to fit a respective frame of the layout template, wherein each distinct image is cropped based on a number of faces in the image and a saliency map of the image;
    replacing the variable in the predefined text of each respective element of the story with the attribute of the distinct image the respective node has been assigned to; and
    determining a number of distinct images to display on each page of the layout template.

20. The computer-readable medium of claim 15, wherein the graph is a first graph of a plurality of graphs, each graph comprising a respective set of nodes, the operation further comprising:
    upon determining that a third node of the first graph cannot be assigned to a distinct image:
        selecting a second graph of the plurality of graphs;
        assigning each node of the second graph to a distinct image of the plurality of images; and
        generating a visual depiction of a second story represented by the second graph.

* * * * *

UNITED STATES PATENT AND TRADEMARK OFFICE
CERTIFICATE OF CORRECTION

PATENT NO. : 10,073,861 B2
APPLICATION NO. : 14/844660
DATED : September 11, 2018
INVENTOR(S) : Ariel Shamir et al.

Page 1 of 1

It is certified that error appears in the above-identified patent and that said Letters Patent is hereby corrected as shown below:

In the Specification

In Column 14, Line 4, after "0.2" insert -- . --.

In the Claims

In Column 20, Line 58, in Claim 17, after "assigning" delete "each".

Signed and Sealed this
Twenty-sixth Day of March, 2019

Andrei Iancu
*Director of the United States Patent and Trademark Office*